United States Patent [19]

Walker

[11] Patent Number: 4,815,052
[45] Date of Patent: Mar. 21, 1989

[54] AUTOMATIC OVERVOLTAGE PROTECTION CIRCUIT

[75] Inventor: Charles S. Walker, Seattle, Wash.
[73] Assignee: Honeywell, Inc., Minneapolis, Minn.
[21] Appl. No.: 215,703
[22] Filed: Jul. 6, 1988
[51] Int. Cl.$^4$ .................. H02H 7/125; H02P 13/24
[52] U.S. Cl. ........................... 363/87; 363/54; 363/129
[58] Field of Search .................. 363/52–54, 363/78, 79, 84, 85, 87, 90, 91, 128, 129; 320/25, 28

[56] References Cited

U.S. PATENT DOCUMENTS

| | | | |
|---|---|---|---|
| 3,825,812 | 7/1974 | De Buhr | 363/87 |
| 4,218,729 | 8/1980 | Chambers | 363/54 |
| 4,455,598 | 6/1984 | Andre | 363/87 |
| 4,598,353 | 7/1986 | Leuthen | 363/87 |
| 4,752,751 | 6/1988 | Walker | 363/87 |
| 4,757,436 | 7/1988 | Ueda et al. | 363/129 |

*Primary Examiner*—Peter S. Wong
*Attorney, Agent, or Firm*—C. Lamont Whitham; Michael E. Whitham

[57] ABSTRACT

An automatic overvoltage protection circuit is provided for an electrical power supply of the type comprising a variable speed three phase alternator (50) having a permanent magnet rotor and three stator output windings (51, 52 and 53), a gated three phase rectifier bridge (60) connected to the three stator output windings and producing a d.c. output voltage, and a control circuit (120) for supplying gating signals at controlled firing angles to the gated three phase rectifier bridge. The control circuit includes first, second and third reference circuits (73, 74 and 75) each including a resonant LRC circuit and connected to a respective one of the three stator output windings, a gating logic circuit (135) connected to the first, second and third reference circuits and providing six outputs, feedback means (122) connected to receive the d.c. output voltage for generating an error voltage, and comparator and isolation means (140 and 145) connected to the gating logic circuit and to the feedback means for generating firing signals for the gated three phase rectifier bridge. The automatic overvoltage protection circuit limits the firing angle of the firing signals at high speed of the alternator to $\cong 59°$ while allowing the firing angle of the firing signals at low speed to be $\cong 0°$. This is accomplished by deliberately selecting the Q and resonant frequency of the reference circuits to achieve this beneficial result.

3 Claims, 5 Drawing Sheets

FIGURE 4 NORMALIZED CIRCUIT FREQ. AND AMPLITUDE RESPONSE

AUTOMATIC OVERVOLTAGE PROTECTION CIRCUIT

BACKGROUND OF THE INVENTION

1. Field of the Invention

The present invention generally relates to electrical power supplies and, more particularly, to an improved variable speed alternator driven power supply which provides automatic overvoltage protection in gated rectifier phase control circuits.

2. Description of the Prior Art

Variable speed alternator driven power supplies are well known in the art, perhaps the most notorious example of which is the conventional charging system of an automobile. The automobile alternator is characterized by a wound rotor; however, in some marine applications, such as torpedo systems, it is essential to utilize an alternator having a permanent magnet rotor. In these applications, the permanent magnet rotor alternator has two important advantages over a wound rotor alternator. First, the permanent magnet rotor alternator can supply a much higher power output for a given alternator size or volume than a wound rotor alternator. Second, the permanent magnet rotor alternator output, when controlled by a gated rectifier bridge, can be easily controlled so as to produce a zero output voltage, this being a critical strategic requirement of certain load systems adapted to be energized from the output of the alternator.

The setting for my invention is the necessity of providing a power supply meeting the following specifications:

(i) a very small but high power and high frequency alternator with a permanent magnet rotor where the mechanical drive to the rotor has a substantial variation in angular velocity while the power supply is under load;

(ii) a gated rectifier circuit, such as a silicon controlled rectifier (SCR) bridge circuit, and (iii) a phase control circuit operatively connected to the gated rectifier circuit and the alternator in a closed loop system.

Several problems need to be overcome in order to satisfy the foregoing specifications. First, due to the fact that very small, high frequency alternators exhibit output voltages which become severely distorted under load, and this distortion tends to prevent the use of the state of the art SCR control techniques. Second, permanent magnet rotor alternators produce an electrical output, the magnitude of which is a direct function of rotor speed. In fact, under "no-load" conditions, the alternator output voltage and frequency are directly proportional to the rotor speed, and this variation in alternator output voltage can cause a very undesirable corresponding variation in the output of the SCR bridge, if not regulated by closed loop control.

To solve the first problem, a reference circuit was required having an output reference voltage which was (a) synchronized to the alternator frequency and (b) was substantially free from harmonic distortion which causes jitter and/or ambiguous operation. To solve the second problem, a special closed-loop regulating system was required.

There, however, remains a third problem which can occur if feedback is lost, a condition which might be caused, for example, by a feedback amplifier failing high or low. More specifically, what can happen under this condition is that the output voltage from the SCR bridge may exceed the rated voltage of the power amplifiers, typically metal oxide silicon field effect transistors (MOSFETs), in an invertor circuit supplied by the alternator driven power supply. The result is instant MOSFET burnout and resulting inoperativeness of the circuits supplied by the invertor circuit.

SUMMARY OF THE INVENTION

It is therefore an object of this invention to provide an automatic overvoltage protection feature in SCR phase control circuits of alternator driven power supplies.

I accomplish this automatic overvoltage protection in the SCR phase control circuits by the simple means of slightly changing the values of the components already in place to yield the desired overvoltage-limiting firing angles. More specifically, the automatic overvoltage protection circuit according to the invention is provided for an electrical power supply of the type comprising a variable speed three phase alternator having a permanent magnet rotor and three stator output windings, a gated three phase rectifier bridge connected to the three stator windings and producing a d.c. output voltage, and a control circuit for supplying gating signals at controlled firing angles to the gated three phase rectifier bridge. The control circuit includes first, second and third reference circuits each including a resonant LRC circuit and connected to a respective one of the three stator output windings, a gating logic circuit connected to the first, second and third reference circuits and providing six outputs, one for each SCR, feedback means connected to receive the d.c. output voltage for generating an error voltage, and comparator and isolation means connected to the gating logic circuit and to the feedback means for generating firing signals having a firing angle which is a function of the speed of the alternator, these firing signals being supplied to the gated three phase rectifier bridge. The automatic overvoltage protection circuit according to the present invention limits the firing angle of the firing signals at high speed of the alternator to $\approx 59°$ while allowing the firing angle of the firing signals at low speed to be $\approx 0°$.

BRIEF DESCRIPTION OF THE DRAWINGS

The foregoing and other objects, aspects and advantages of the invention will be better understood from the following detailed description of a preferred embodiment of the invention with reference to the accompanying drawings, in which.

DETAILED DESCRIPTION OF A PREFERRED EMBODIMENT OF THE INVENTION

Figure 1:
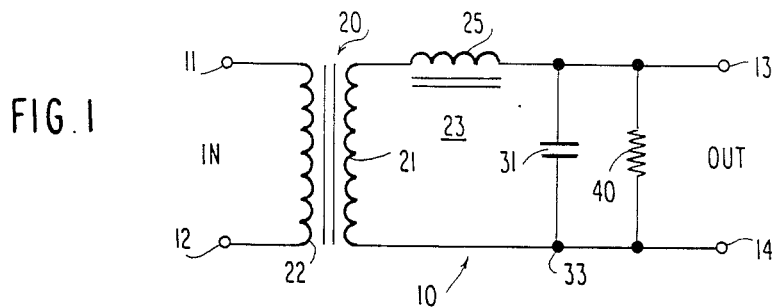
FIG. 1 is a schematic diagram of a reference circuit according to the invention.

Referring now to the drawings, and more particularly to FIG. 1, there is shown a reference circuit 10 having a pair of input terminals 11 and 12 adapted to be connected to an alternator stator winding and a pair of output terminals 13 and 14 adapted to be connected to an SCR control circuit comparator. A transformer 20 has a secondary winding 21 and a primary winding 22, the latter of which is connected to terminals 11 and 12. A series LC resonant circuit 23, comprising inductor 25 and capacitor 31, is connected across secondary winding 21. An output resistor 40 is connected across terminals 13 and 14. In the invention disclosed and claimed in my prior U.S. Pat. No. 4,752,751, the values of the inductive of inductor 25 and the repacitance f capacitor 31 are chosen to make circuit 23 resonant substantially below the lowest frequency expected at terminals 11 and 12. As will be explained in more detail hereinafter, the resonance and Q of this circuit are adjusted according to certain aspects of the present invention.

Figure 2:
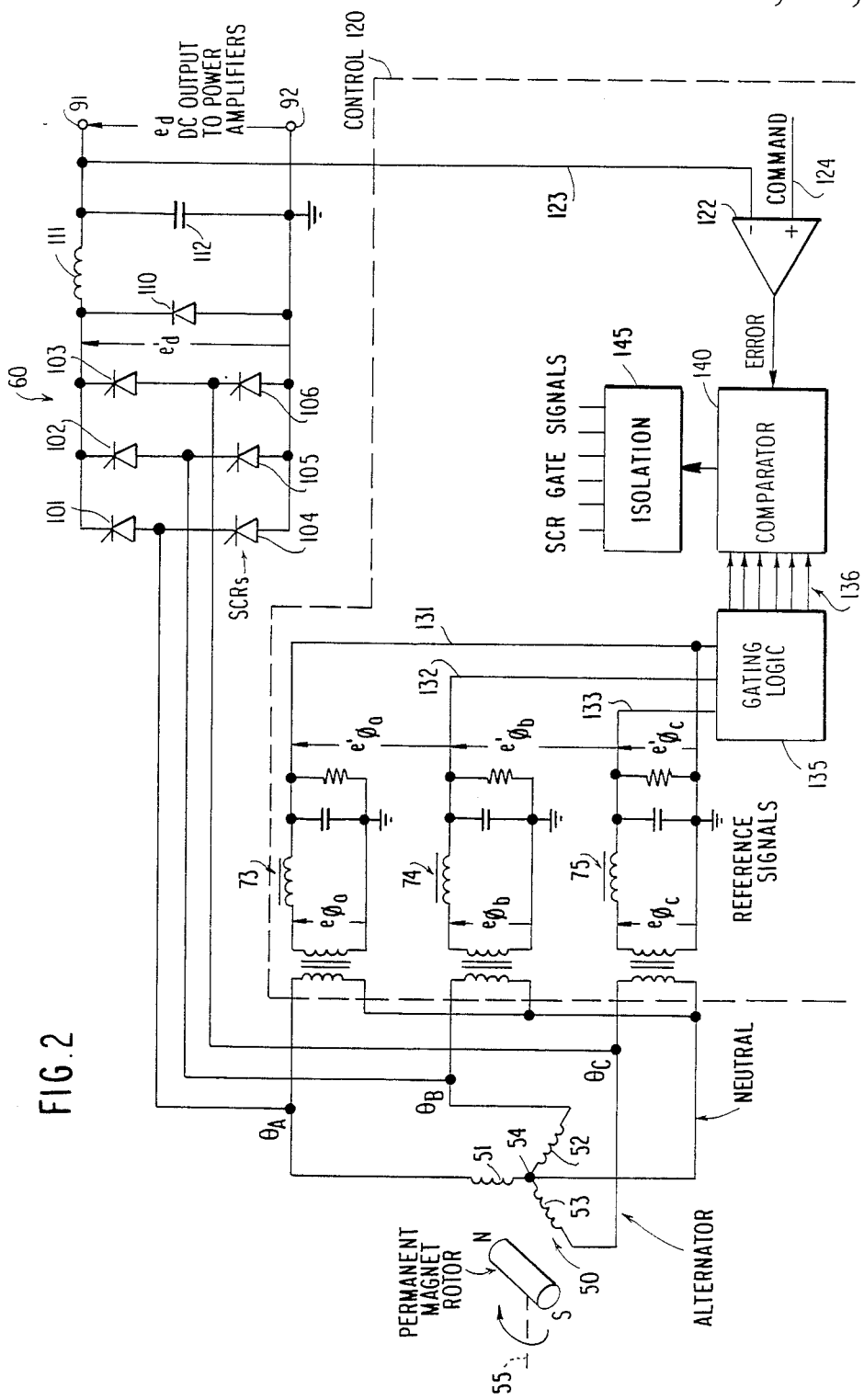
FIG. 2 is a block and schematic diagram of an alternator driven power supply according to the invention using reference circuits as shown in FIG. 1.

FIG. 2 shows the power supply of the subject invention comprising a three phase alternator 50 having windings 51, 52, and 53 with a common or neutral terminal 54. The alternator is driven by a suitable mechanical connection 55 to, for example, the prime mover of a torpedo. The alternator windings are connected to an SCR bridge 60 and also to a plurality of reference circuits 73, 74 and 75, each like circuit 10 in FIG. 1. The reference circuits supply their outputs to a phase control gating logic 135, which is part of a phase control circuit 120. Bridge 60 supplies a direct current output on terminals 91 and 92, and that output is fed back through conductor 123 to phase control circuit 120.

The alternator 50 has a permanent magnet rotor and, as mentioned, may be driven through mechanical connection 55 by a prime mover in a torpedo. Such a prime mover is characterized as having a widely varying speed with the result that the frequencies of the voltages of the alternator windings vary from a relatively low frequency, corresponding to a relatively low speed of the prime mover, to a substantially higher frequency, corresponding to a substantially higher speed of the prime mover. A 2:1 ratio of high speed to low speed would be representative for this type of apparatus.

The SCR bridge 60 comprises six SCRs designated by reference numerals 101 to 106, inclusive, arranged in a full wave rectifier configuration. The bridge 60 further comprises a free wheeling rectifier 110 connected across the SCRs to bypass load current during intervals of negative bridge input voltage and an inductor 111 and a capacitor 112 connected in series across the SCRs. While the preferred embodiment of the invention uses SCRs in the controlled rectifier bridge, those skilled in the art will recognize that other switching devices can be used.

The gating logic 135 provides a means of selectively applying the outputs from the reference circuits 73, 74 and 75 through output connections 136 to a first input of a comparator 140. The second input of comparator 140 is supplied from summing amplifier 122 which provides the feedback signal from the SCR bridge. More specifically, the feedback signal provided on conductor 123 is supplied to the negative input of summing amplifier 122 and a command signal is provided on conductor 124 is supplied to the positive input of summing amplifier 122. The comparator 140 has an output which is supplied to a standard isolation unit 145 having a plurality of outputs adapted to be connected to the gates of the SCRs in the bridge 60.

Figure 3:
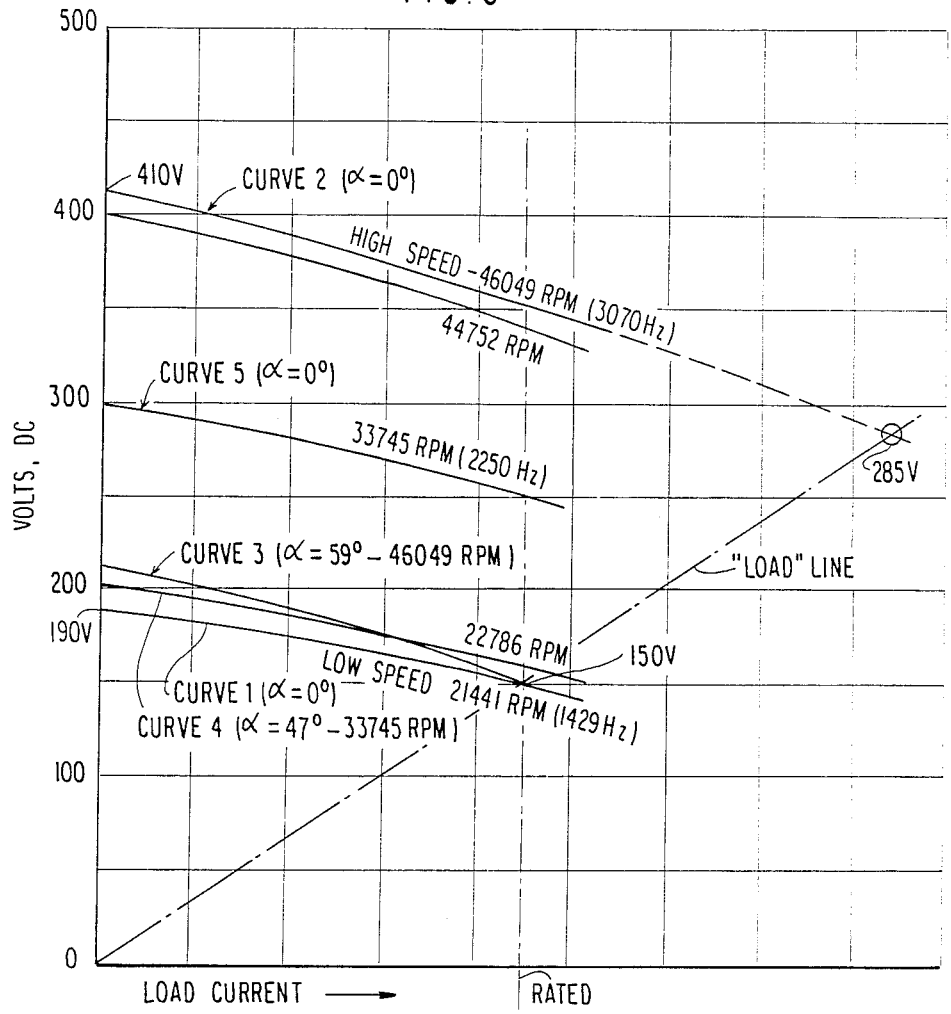
FIG. 3 is a graph showing alternator-bridge output versus load current characteristics of the power supply shown in FIG. 2.

FIG. 3 shows the d.c. voltage versus current curves with alternator r.p.m. as a parameter. For example, at minimum speed (21,441 r.p.m.), the output voltage starts at 190 volts no-load, point P on curve 1, and is 150 volts at rated load, point Q on curve 1. FIG. 3 illustrates the problem solved by this invention. At high speed (46,049 r.p.m.), the alternator can produce 410 volts no-load, point R on curve 2, and 290 volts to the load, point S on curve 2. (It is noted that this overvoltage has driven the load output current to 188% of rated current.) For curve 2, as well as curve 1, a firing angle $\alpha \leq 0$ represents a full-on condition as might occur through loss of the feedback signal, an error amplifier failing "high" or "low", or the like. This runaway voltage condition produces an immediate result—instant power amplifier burnout. This is because the power amplifier inverters see more than twice the SCR bridge output voltage, which for the high speed case, is more than 580 volts at point S on curve 2. Since the MOSFETs used in the inverter are rated at 450 volts, burnout occurs. Of course, 600 volt MOSFETs could be specified at extra cost, if they were available.

Curve 3 illustrates the solution to this problem according to the invention. If the firing angle, $\alpha$, can be prevented from being less than 59° at high speed, the output voltage will be automatically limited to about 150 volts even if, for example, the output voltage feedback signal is lost. But at low speed, $\alpha$ needs to be 0°, and at mid-speed, $\alpha$ should be 47°. These requirements are met by the following criteria.

1. Increase the Q of the reference circuits from 0.97 to 1.0.
2. Raise the resonant frequency of the reference circuits from 1221 Hz to 1429 Hz.
3. Reconnect the comparison circuits so that the reference circuit outputs are summed to become line-to-line versus line-to-neutral reference voltages.

The foregoing changes in my basic circuit as disclosed in my prior U.S. Pat. No. 4,752,751 results in the following:

$\alpha$ (minimum speed)=0°(vs. −13° in my prior patent)

$\alpha$ (maximum speed)=59.3° (vs. 33° in my prior patent)

$\alpha$ (mid-speed)=43.2° (vs. 47° in my prior patent)

Figure 4:
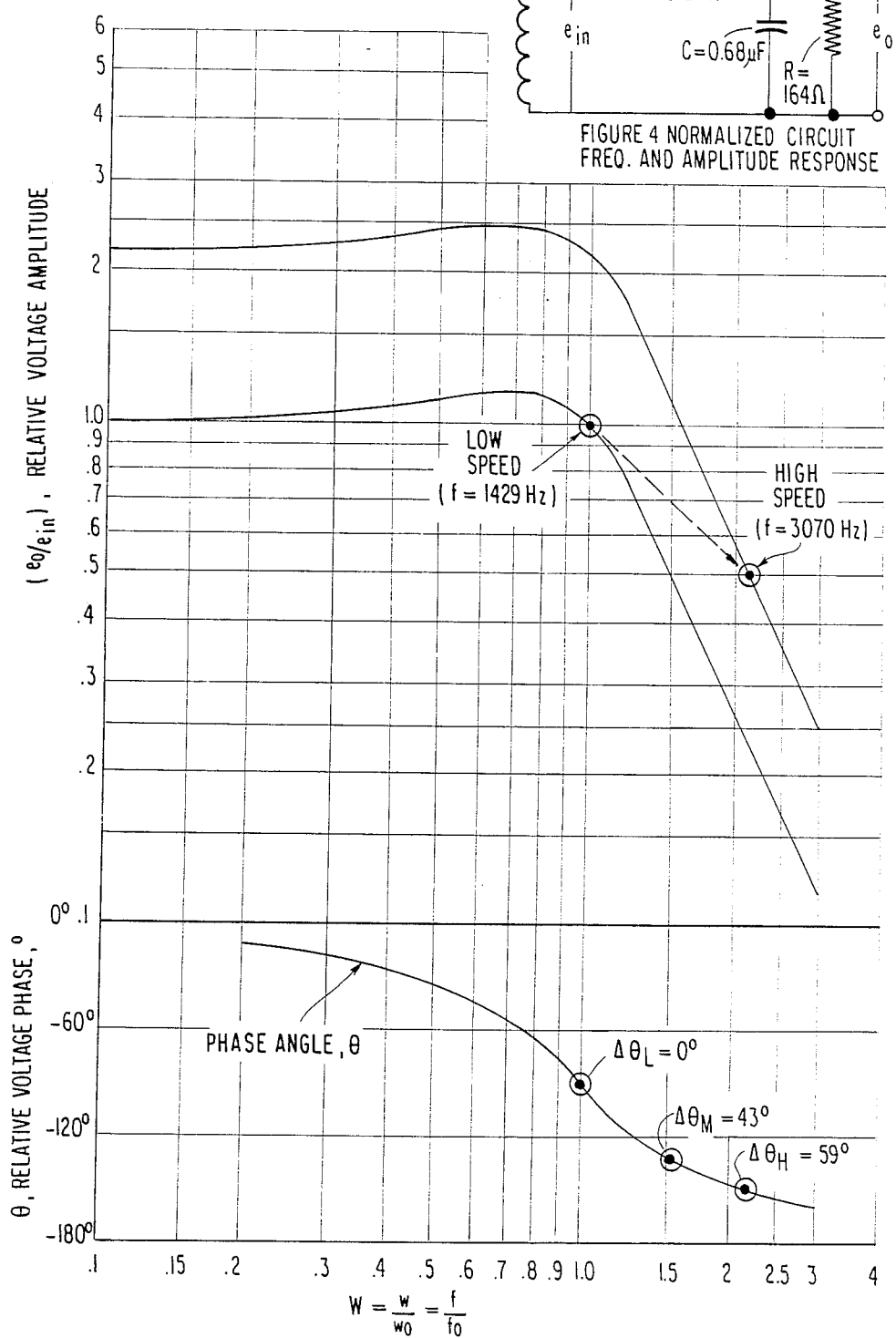
FIG. 4 is a graph showing the frequency and amplitude response characteristics of the reference circuit shown in FIG. 1.

FIG. 4 reflects these charges and shows the new component values. It is noted that the plots shown in FIG. 4 are amplitude vs. frequency response curves with the input voltage held constant. In this and my prior patent, as the alternator changes frequency, so does the input voltage. Points A and B reflect and include this effect. FIGS. 5A to 5E and 6A to 6E show the voltage waveforms of interest for low and high alternator speed, respectively. These figures clearly show that the objective of limiting $\alpha$ to 59° minimum at high speed has been met. By comparison, my prior design allowed $\alpha$ to be 33° at high speed.

Figure 5A:
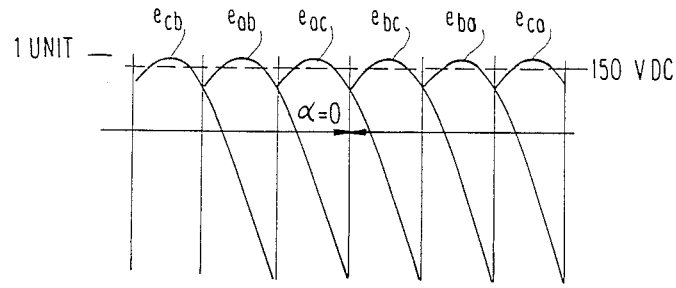
FIGS. 5A to 5E are waveform diagrams showing voltages generated at low speed.
Figure 5B:
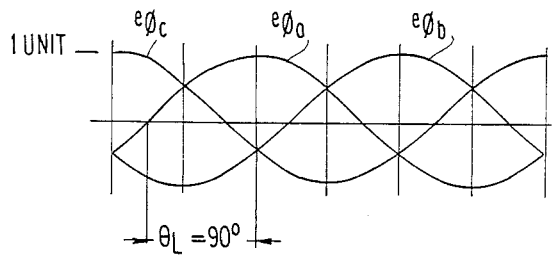
Figure 5C:
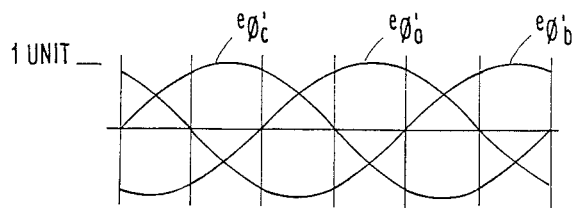
Figure 5D:
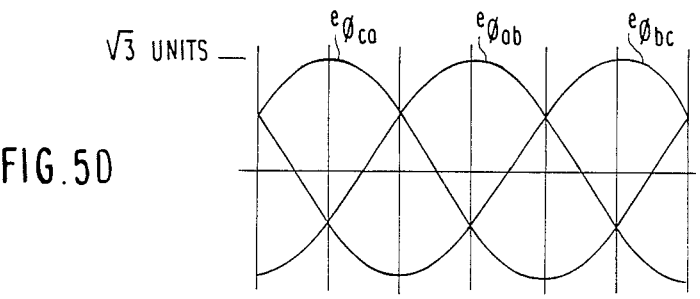
Figure 5E:
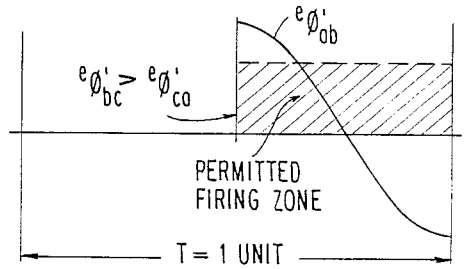
Figure 6A:
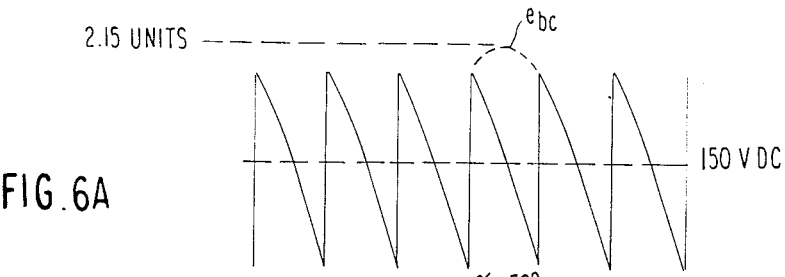
FIGS. 6A to 6E are waveform diagrams showing voltages generated at high speed.
Figure 6B:
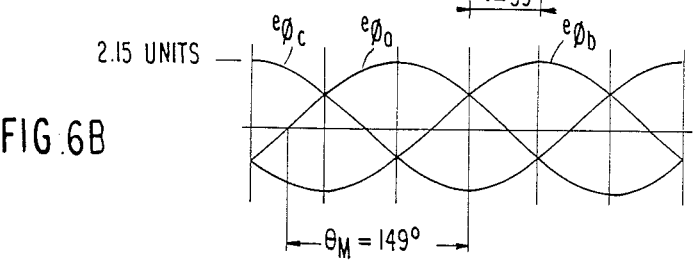
Figure 6C:
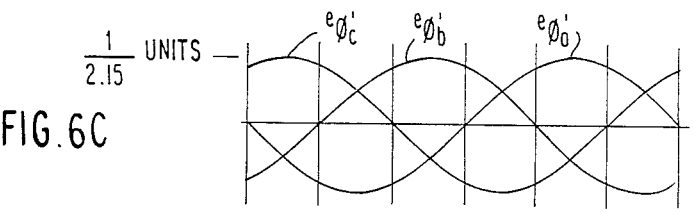
Figure 6D:
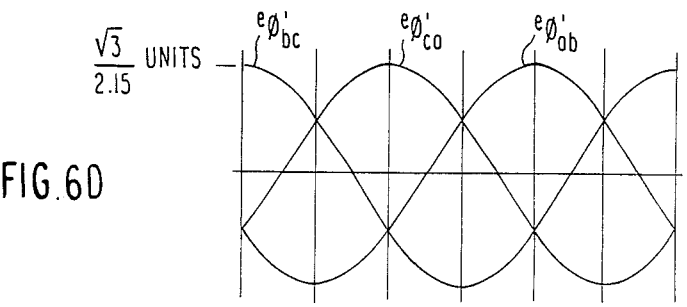
Figure 6E:
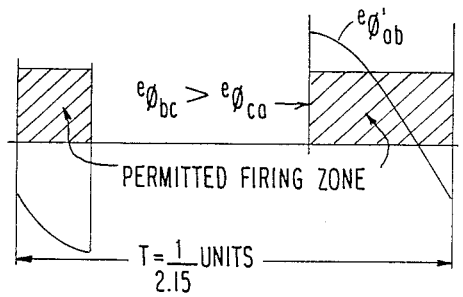

With particular reference to FIG. 5A, the curve shows $e_d'$, the input voltage to the LC filter in FIG. 1. In order to get 150 volts output, the firing angle, $\alpha$, has been reduced to 0°. In contrast, in FIG. 6A, the alternator output is ≈2.15 times the low speed value. Thus, to hold the output at 150 volts, the firing angle is retarded to 59°. For each case, FIGS. 5B and 6B, 5C and 6C, and 5D and 6D, respectively show the three reference circuit inputs, the three reference circuit outputs, and the three outputs added. In FIG. 6B, the inputs have amplitudes which are 2.15 times that of FIG. 5B. In FIG. 5C, the outputs are shifted by 90° corresponding to the "low speed" curve of FIG. 4. In FIG. 6C, the amplitudes are 2.15 times smaller and are shifted by 149° corresponding to the "high speed" curve of FIG. 4. In FIG. 5D, the net phase shift of the added outputs is $-30°$. In FIG. 5E, the phase bc is compared with ab to form a "permitted" firing zone. In this example, the SCR producing voltage $e_{bc}$ can only be fired in this region. In this figure, the $T=1$ unit corresponds to $1/1429=700$ sec. In FIG. 6E, the permitted firing zone has been moved 59° to the right. This achieves the automatic overvoltage objective of limiting the output to 150 volts by holding the firing angle, $\alpha$, to 59° minimum. T is now $1/3070=326$ sec.

In summary, my invention is predicated on the recognition that a high voltage can exist in the power supply. The steps required to implement my invention are first to plot a curve of minimum firing angle vs. frequency. From an analysis of this curve, the permitted firing zone is determined. The reference circuit components are then selected to yield a good match to the permitted zone. With the LRC circuit of FIG. 1, the three components determine the Q and the resonant frequency which, in turn, uniquely determine the relative phase shifts. Higher order reference circuits would allow a closer match.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. In an electrical power supply of the type comprising a variable speed three phase alternator having a permanent magnet rotor and three stator output windings, a gated three phase rectifier bridge connected to said three stator output windings and producing a d.c. output voltage, and a control circuit for supplying gating signals to said gated three phase rectifier bridge, said control circuit including first, second and third reference circuits connected to a respective one of said three stator output windings, a gating logic circuit connected to said first, second and third reference circuits and providing six outputs, one for each gated rectifier, feedback means connected to receive said d.c. output voltage for generating an error voltage, comparator and isolation means connected to said gating logic circuit and to said feedback means for generating firing signals at controlled firing angles for said gated three phase rectifier bridge, the improvement comprising means for limiting the firing angles of said firing signals at a high speed of said alternator to $\cong 59°$ while allowing the firing angles of said firing signals at a low speed to be $\cong 0°$.

2. The electrical power supply recited in claim 1 wherein said reference circuits each include resonant circuits and said means for limiting is the reference circuits having a Q and resonant frequency selected to achieve the high speed firing angle of $\cong 59°$ and the low speed firing angle of $\cong 0°$.

3. The electrical power supply recited in claim 2 wherein each of said resonant circuits are connected to a respective one of said stator windings by a transformer having a primary and a secondary winding and comprise an inductor and a capacitor connected in series with said secondary winding and a resistor connected in parallel with said capacitor, a voltage signal across said resistor being supplied to said gating logic circuit.

* * * * *